UNITED STATES PATENT OFFICE.

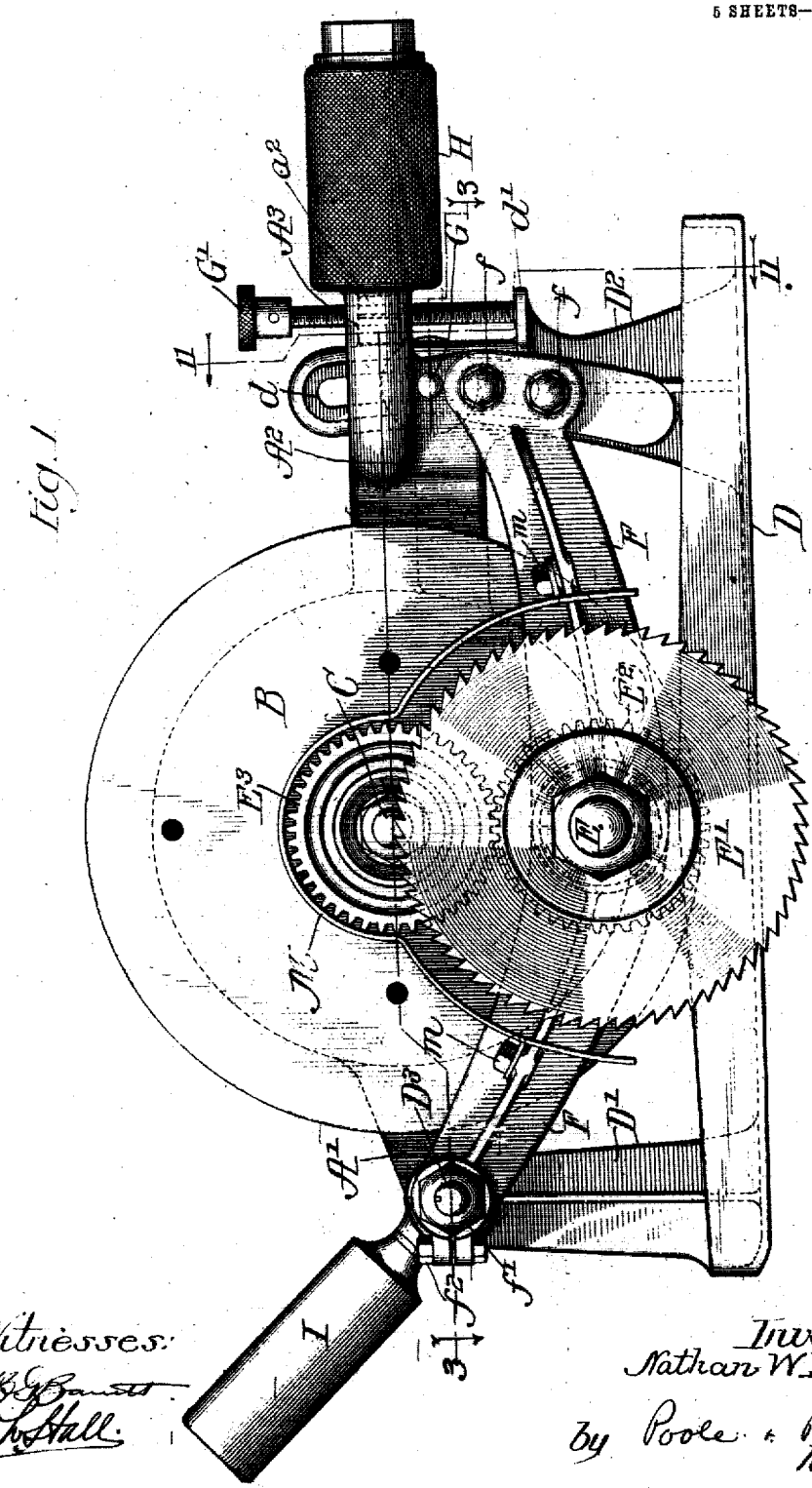

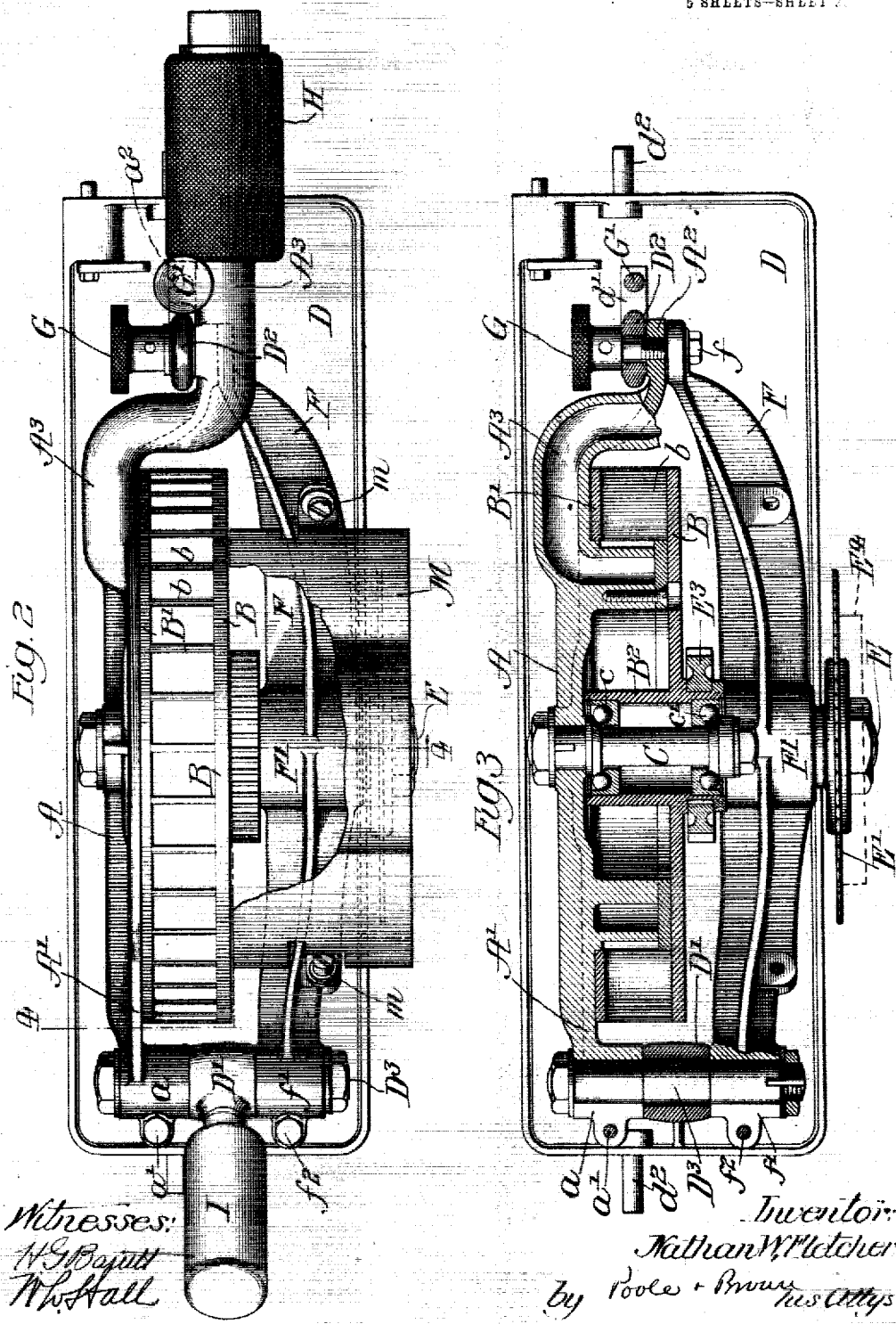

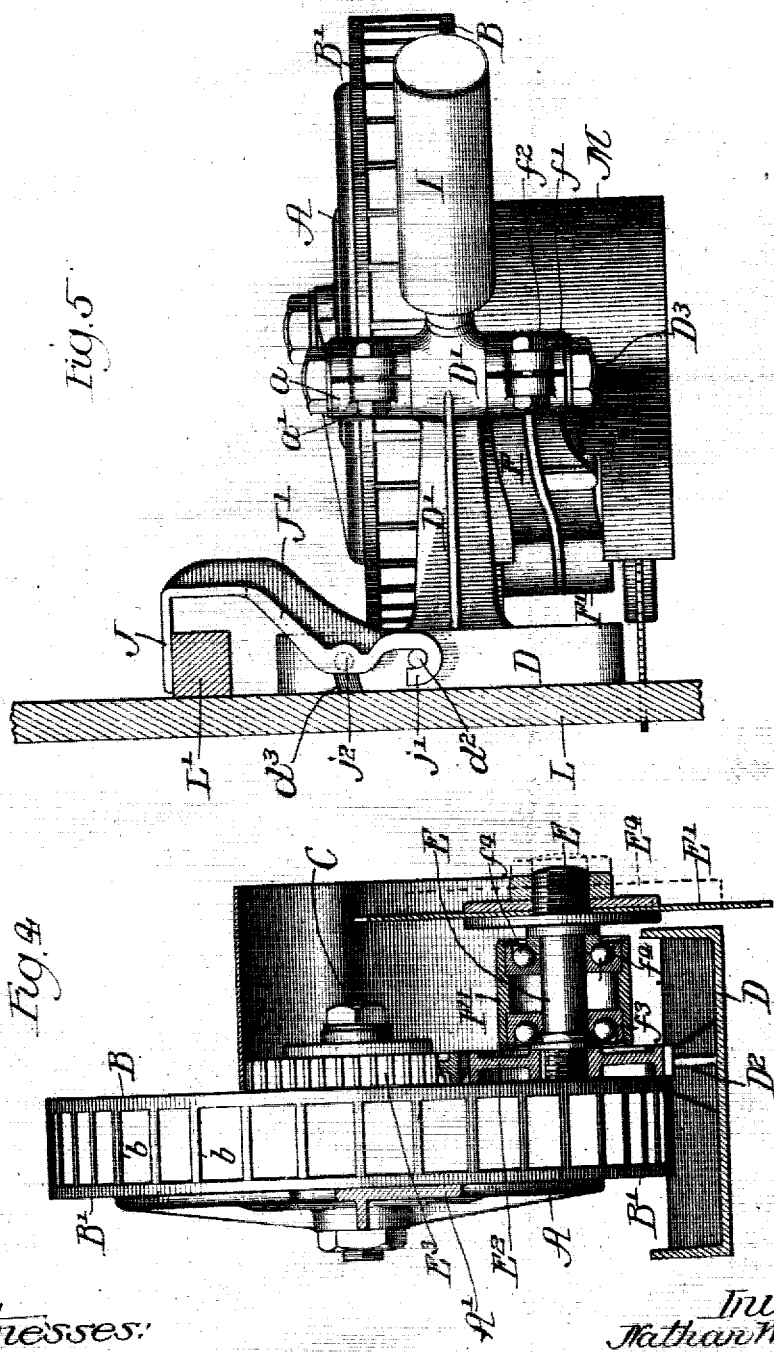

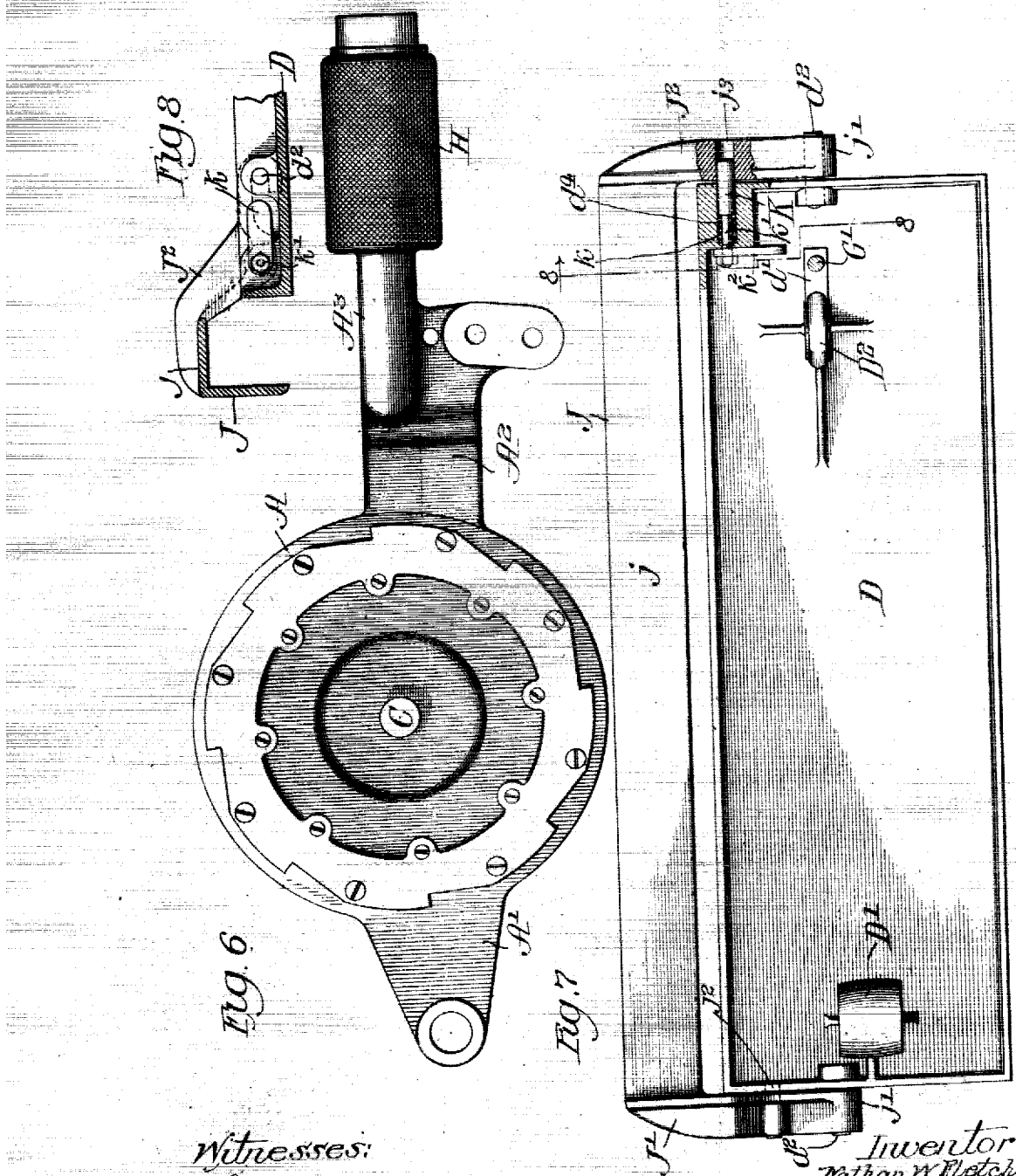

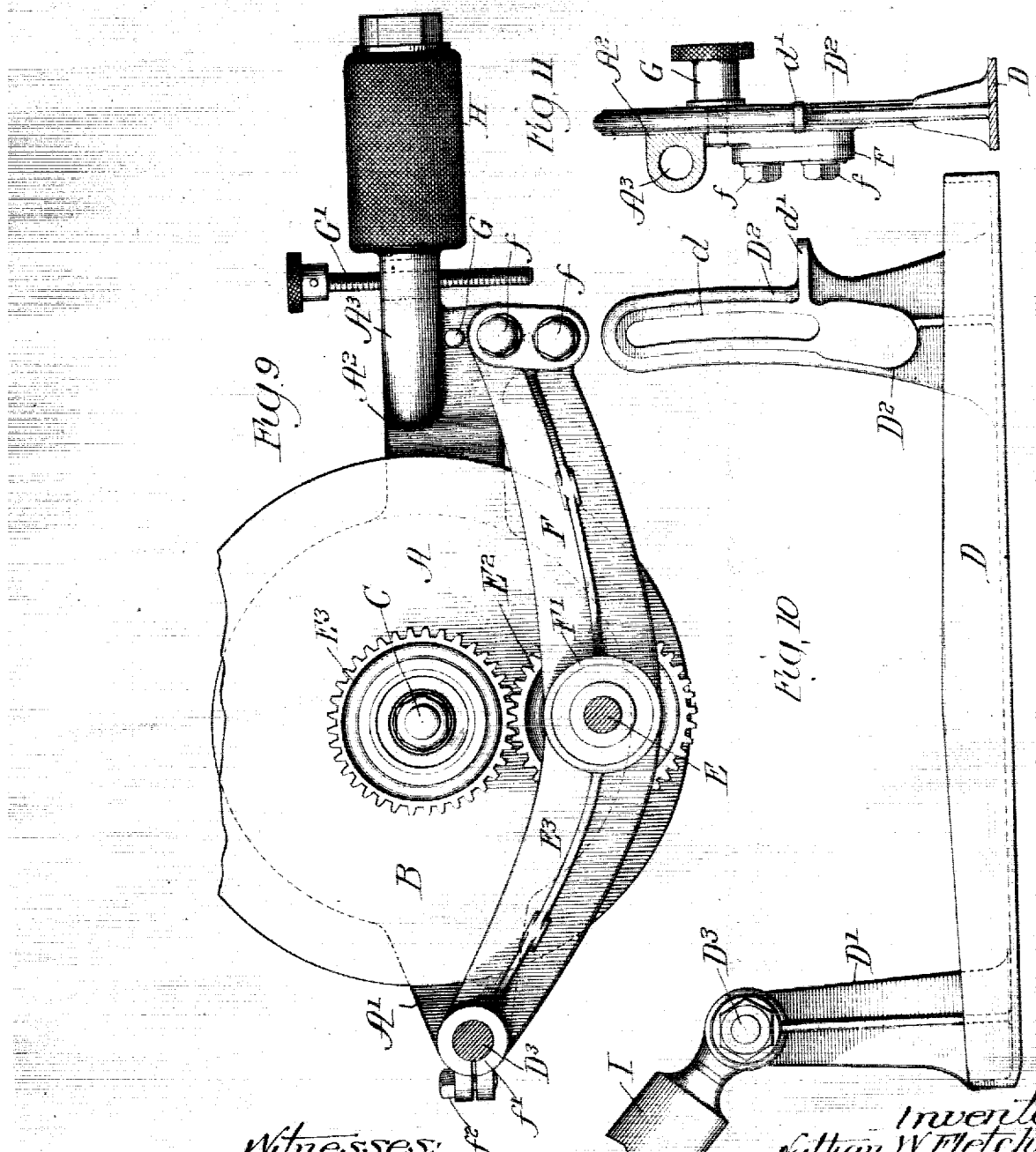

NATHAN W. FLETCHER, OF CHICAGO HEIGHTS, ILLINOIS, ASSIGNOR TO TURBINE MOTOR TOOL COMPANY, OF CHICAGO, ILLINOIS, A CORPORATION OF ILLINOIS.

MOTOR-DRIVEN TOOL.

No. 824,347.   Specification of Letters Patent.   Patented June 26, 1906.

Application filed January 3, 1905. Serial No. 239,470.

*To all whom it may concern:*

Be it known that I, NATHAN W. FLETCHER, a citizen of the United States, residing at Chicago Heights, in the county of Cook and State of Illinois, have invented certain new and useful Improvements in Motor-Driven Tools; and I do hereby declare that the following is a full, clear, and exact description thereof, reference being had to the accompanying drawings, and to the letters of reference marked thereon, which form a part of this specification.

This invention relates to portable machines or tools for cutting, polishing, or grinding of that class which have a rotative or turbine motor and a supporting-block or base-plate adapted to rest and slide upon the surface of the work or object to be operated upon and which supports a rotative cutting, grinding, or polishing tool and the motor which drives the same.

The invention consists in the matters hereinafter set forth, and more particularly pointed out in the appended claims.

As shown in the accompanying drawings, Figure 1 is a view in side elevation of a tool constructed in accordance with my invention, the same being shown as provided with a cutting-tool in the form of a rotative saw. Fig. 2 is a plan view thereof. Fig. 3 is a plan section taken upon line 3 3 of Fig. 1. Fig. 4 is a view in cross-section of the base or supporting part of the tool and the bearings of the tool-arbor thereof, showing the parts of the motor in side elevation, said section being taken upon the indirect line 4 4 of Fig. 2. Fig. 5 is an end view of the machine, showing the same in the position in which it will be placed when operating upon a vertical surface. Fig. 6 is a detail face view of the stationary part or member of the motor separated from the other parts. Fig. 7 is a top or plan view of the base-plate of the machine, showing a detachable guide mounted thereon. Fig. 8 is a detail section taken on line 8 8 of Fig. 7. Fig. 9 is a view in side elevation of the adjustable frame which carries the motor, together with the motor itself, separated from the base-plate of the machine, the saw being omitted. Fig. 10 is a view in side elevation of said base-plate with parts which are permanently attached thereto. Fig. 11 is a detail sectional view taken transversely through the base-plate on the line 11 11 of Fig. 1.

As illustrated in said drawings, A designates the stationary or non-rotative body or member of the motor, which is of circular or disk form, and B indicates the rotative member or wheel thereof, which has the general form of a flat disk and is provided at its periphery with a series of curved blades or buckets $b$ $b$, which project from the side face of the disk toward the stationary part A and are attached to a supplementary annular supporting-ring B', arranged parallel with and at some distance from the periphery of the wheel B. Said rotative member B is attached to a central sleeve or hub $B^2$, which turns on a central bearing axle or spindle C, secured in a central aperture in the body A and projecting therefrom, so as to afford a bearing for the central sleeve or hub $B^2$. Antifriction or ball bearings $c$ $c'$ are shown as interposed between the ends of the sleeve $B^2$ and the said spindle C.

D indicates a flat elongated base plate or block provided with two rigid uprights or supporting-standards D' $D^2$. The disk-shaped body part A is provided with a radially-extending lug or projecting arm A', which is engaged with a transverse pivot-pin $D^3$, passing through the upper end of the standard D', which is located near one end of the base-plate D. Said body portion A is also provided at a point diametrically opposite the arm A' with an extension or arm $A^2$, which projects radially from the side margin of the body portion A and is adapted to be adjustably secured to the standard $D^2$, which latter standard is located near the opposite end of said base-plate. The arm $A^2$ is shown as formed integral with or in part by a tube $A^3$, which forms a supply-pipe by which air is supplied to the motor.

E indicates a tool-carrying shaft or arbor, which is arranged parallel with the base-plate and mounted in a bearing attached to or supported rigidly from the non-rotative part or body A of the motor. Said arbor is driven or rotated by suitable driving connection with the rotative disk B. The rotary cutting-tool or saw E' illustrated is mounted on the arbor E and is adapted to act on the work or object to be operated upon against a flat face or surface of which the base-plate D rests and on which the tool as a whole slides or moves. Said arbor E is shown as mounted in a tubular hub or bearing F', which forms part of a supporting-bracket F, which is arranged generally parallel with the non-rotative body A of the motor and is connected at one end with the pivot-pin D³, by which the body A is pivoted to the standard D', and at its opposite end is rigidly attached to the arm A² by bolts $f f$, Figs. 1 and 9, said bracket F being located at a distance from the disk A sufficient to give space or room for the rotative member B of the motor between said parts. The pivot-pin D³ is adapted to turn or rotate in a bearing-aperture in the upper end of the standard D' and is rigidly attached at its ends to the arm A' and bracket F by being inserted in split sockets $a$ and $f'$, formed on the ends of said parts and provided with clamping-screws $a'$ and $f^2$, by which the sockets may be firmly clamped on the ends of said pin. The pin D³ thus secured to the arm A² and bracket F serves to afford a rigid connection between said parts. The disk A and bracket F together constitute a rigid frame which carries the motor and the tool-carrying arbor E and which as a whole is connected with the base-plate D by the pivot-pin D³, so that when the said frame is moved or swung on the said pivot-pin the motor and tool-carrying arbor E may be moved toward or from the base-plate and the tool may be adjusted relatively to the contact-face of said base-plate.

The standard D² is provided with a curved slot $d$, Figs. 1 and 10, concentric with the pivot-pin D³, and a clamping-screw G passes through said slot and engages the arm A² for clamping said arm to the standard. To afford means for accurately adjusting the tool-spindle E relatively to the base-plate, an adjusting-screw G' is inserted through a lug $a^2$ on the arm A² and is adapted to act against a shoulder $d'$ on the standard D².

The bearing-sleeve F' for the tool-arbor E is shown as provided with two separated roller-bearings $f^3 f^4$, which engage the said arbor near the ends of the same. The saw E' is attached to the outer end of the arbor E, which projects outside of the bearing $f^4$, said saw being located laterally outside of the adjacent side margin of the base-plate D. Provision is made for driving the said arbor E from the disk B of the motor, consisting of a gear-wheel E², Figs. 4 and 9, attached to the inner end of the said arbor, and a gear-wheel E³, which is secured to the end of the sleeve B², which is extended outwardly past the outer face of the disk B to receive said gear-wheel, Fig. 3.

The dotted lines E⁴ in Figs. 3 and 4 indicate a grinding or polishing disk which may be carried by the tool-arbor E instead of the saw illustrated. The outer end of the supply-pipe A³, as well as the extension or flange thereon which forms the arm A², are shown as offset from the plate A, so that they are located nearly over the longitudinal center line of the base-plate, the intermediate part of said supply-pipe being extended transversely of the motor between the disk B and the standard D², as seen in Figs. 2 and 3. On the outer end of the air-supply pipe A³ is a tubular hand-grip H, which constitutes one of the handles by which the machine is grasped by the operator in handling the same. A second hand I is located near the opposite end of the machine, the same being shown as attached to the top of the standard D'.

In Figs. 5, 7, and 8 is illustrated an attachment for the base-plate D, consisting of a longitudinal guide-bar J, located at one side of the base-plate above or inside of the bearing-face of said base-plate, so that no part of the bar projects beyond the said bearing-face, and having an inwardly-facing guiding-surface for contact with a guiding-strip or the like interposed between the said guide-bar and the base-plate. Said guide-bar is provided at its ends with rigid arms J' J², by which the said bar may be detachably connected with the base-plate and which serve to hold the guide-bar at a distance from and parallel with the side edge of the base-plate. The guide-bar is shown as made in the form of an angle-bar, the same being provided with a stiffening-flange $j$, Fig. 8. For detachably connecting the guide-bar J to the base-plate the latter has at its ends outwardly-extending fixed studs $d^2 d^2$, Figs. 2, 5, and 7, and the ends of the arms have U-shaped or open sockets $j' j'$, Fig. 5, to receive said studs. The arm J' has an inwardly-extending stud $j^2$, which engages the closed end of a slot $d^3$ in the adjacent end of the base-plate, said slot $d^3$ being curved concentrically with the stud $d^2$ and opening through the bottom or bearing-face of the base-plate. The other arm J² of the guide-bar is provided with a socket $j^3$, adapted for engagement with a sliding bolt K, mounted in a socket $d^4$, Fig. 7, in the base-plate. The bolt K is preferably held by a coiled spring $k$ in its extended position, said spring being located in the socket $d^4$ and surrounding a stem $k'$ on the bolt, which stem projects through the inner wall of the socket $d^4$ and is attached to an arm $k^2$, by which the bolt may be drawn backwardly to effect its release from and engagement with the socket $j^3$. The guide-bar J is attached to the base-plate by first engaging the hooked ends $j' j'$ of the arms J' J² with the studs $d^2 d^2$ on the base-plate and then swinging the guide-bar laterally until the stud $j^2$ on the arm J' reaches the inner end of the groove $d^3$. The socket $j^3$ will then be opposite the bolt K, and the latter having been previously retracted will be allowed to advance into the socket and will lock the guide-bar in position for operation. The said guide-bar J will be employed in any case in which a guiding-surface parallel with the proposed line of severance is employed to guide the saw or cutter along said line. Fig. 5 illustrates the position of the parts when the tool is used to trim off in a straight line the lower ends of a series of boards or wooden strips, such as the siding of a railway-car. In said Fig. 5 L indicates in section such vertical boards or strips, and L' a horizontal guide-strip attached to the boards L above and parallel with the proposed line of severance, the guide-bar J in this instance engaging the upper surface of the said guide-strip and serving to support the weight of the tool as the same is moved along and to guide the saw E' in cutting. The said guide-bar J may be similarly employed in the use of a grinding or polishing wheel or disk instead of a saw. M indicates a shield or covering-strip having the form of a curved metal plate which extends over the gear-wheel E³ and the saw E' and is secured to the bracket F by means of screws or bolts m m, which are inserted through an outwardly-extending longitudinal flange on said bracket.

I claim as my invention—

1. A portable tool comprising a base-plate provided with two standards, a turbine-motor, a rigid frame formed in part by the non-rotative part of said motor, said frame being pivoted to one of said standards and having adjustable connection with the other standard, and a tool-arbor which is driven by the motor and is mounted on said frame between said standards.

2. A portable tool comprising a base-plate provided with two standards, a turbine-motor, the non-rotative part of which is provided with oppositely-extending arms, one of which is pivoted to one of said standards and the other adjustably secured to the other standard, a bracket attached at its ends to the said non-rotative part of the motor and extending outside of the rotative part or wheel thereof, and a tool-arbor mounted in said bracket between the standards.

3. A portable tool comprising a base-plate provided with two standards, a turbine-motor, the non-rotative part of which is provided with oppositely-extending arms, a pivot-pin rigidly attached to one of said arms and adapted to turn in one of the standards, means for adjustably securing the other of said arms to the other standard, a bracket which extends across the non-rotative part of the motor outside of the rotative member thereof, said bracket being rigidly attached at one end to said pivot-pin and at its opposite end to the adjacent arm on the non-rotative part of the motor, and a tool-arbor mounted in said bracket between the ends of the same.

4. A portable tool comprising a base-plate provided with two standards, a turbine-motor, a rigid frame formed in part by the non-rotative part of said motor, said frame being pivoted to one of said standards and having adjustable connection with the other standard and embracing a bracket which extends outside of the rotative member of the motor, a tool-arbor mounted on said bracket between said standards and intermeshing gear-wheels on the rotative members of the motor and the adjacent end of said arbor.

5. A portable tool comprising a base-plate provided with two standards, a turbine-motor, the non-rotative part of which is provided with a lateral arm which is pivoted to one of said standards and with a second arm adjustably secured to the other standard, a bracket attached at its ends to the arms on said non-rotative part of the motor and extending outside of the rotative member thereof, a tool-arbor mounted in said bracket, and intermeshing gear-wheels on said rotative member and the adjacent end of the arbor.

6. A portable tool comprising a base-plate provided with two standards, a turbine-motor, the non-rotative part of which is provided with oppositely-extending lateral arms, one of which arms is pivotally connected with one of the standards and the other is adjustably secured to the other standard, a bracket which extends across the non-rotative part of the motor outside of the rotative member thereof, said bracket being attached at its ends to the arms on the non-rotative part of the motor, said bracket being provided with a transverse, integral bearing-sleeve, and a tool-arbor extending through and having bearing in said sleeve.

7. A portable tool comprising a base-plate provided with two standards, a turbine-motor, the non-rotative part of which is provided with oppositely-extending arms, one of which arms is pivotally connected with one of the standards and the other is adjustably secured to the other standard, a bracket which extends across the non-rotative part of the motor outside of the rotative member thereof, said bracket being attached at its opposite end to the arms on the non-rotative part of the motor, said bracket being provided with a transverse, integral bearing-sleeve, a tool-arbor mounted in said sleeve, and intermeshing gear-wheels on the said arbor and on the rotative member of the motor.

8. A portable tool comprising a base-plate provided with two standards, a turbine-motor, a rigid frame formed in part by the non-rotative part of said motor, said frame embracing a bracket which extends outside of the rotative member of the motor and being provided with a rigidly-attached spindle which extends therefrom toward the bracket, and the rotative member of the motor having a central integral bearing-sleeve which surrounds and has bearing in said spindle, a tool-arbor which is mounted on said bracket between its ends and intermeshing gear-wheels mounted one on the inner end of said arbor and the other on the adjacent end of said sleeve on the rotative part of the motor.

9. A portable tool embracing a base-plate, a motor and tool-arbor mounted on said base-plate, and a guide-bar located at one side of the base-plate and above or inside of the plane of the bearing-face of the base-plate and provided with an inwardly-facing guiding-surface and at its ends with two supporting-arms for connecting it with said base-plate, said arms and the base-plate being provided with interlocking means by which the guide-bar may be detachably secured to the base-plate.

10. A portable tool embracing a base-plate, a motor and a tool-arbor mounted on said base-plate, a guide-bar provided at its ends with two supporting-arms provided at their ends with open sockets, studs on the ends of the base-plate for engagement with said sockets and a spring-actuated bolt on the base-plate adapted for engagement with one of said arms.

11. A portable tool embracing a base-plate, a motor and tool-arbor mounted on said base-plate, a guide-bar provided at its ends with supporting-arms, said arms being provided at their ends with open sockets and the base-plate being provided at its ends with studs for engagement with said sockets, one of said arms being provided with a stud and the adjacent end of the base-plate with a groove to engage said stud, and the other arm being provided with a bolt-receiving socket and the adjacent end of said base-plate with a spring-actuated bolt adapted to engage said bolt-receiving socket.

In testimony that I claim the foregoing as my invention I affix my signature, in presence of two witnesses, this 19th day of December, A. D. 1904.

NATHAN W. FLETCHER.

Witnesses:
C. CLARENCE POOLE,
GEORGE R. WILKINS.